April 22, 1930.   G. E. SEIL   1,755,614
AERATION AND GAS PURIFICATION APPARATUS
Filed April 9, 1925   5 Sheets-Sheet 1
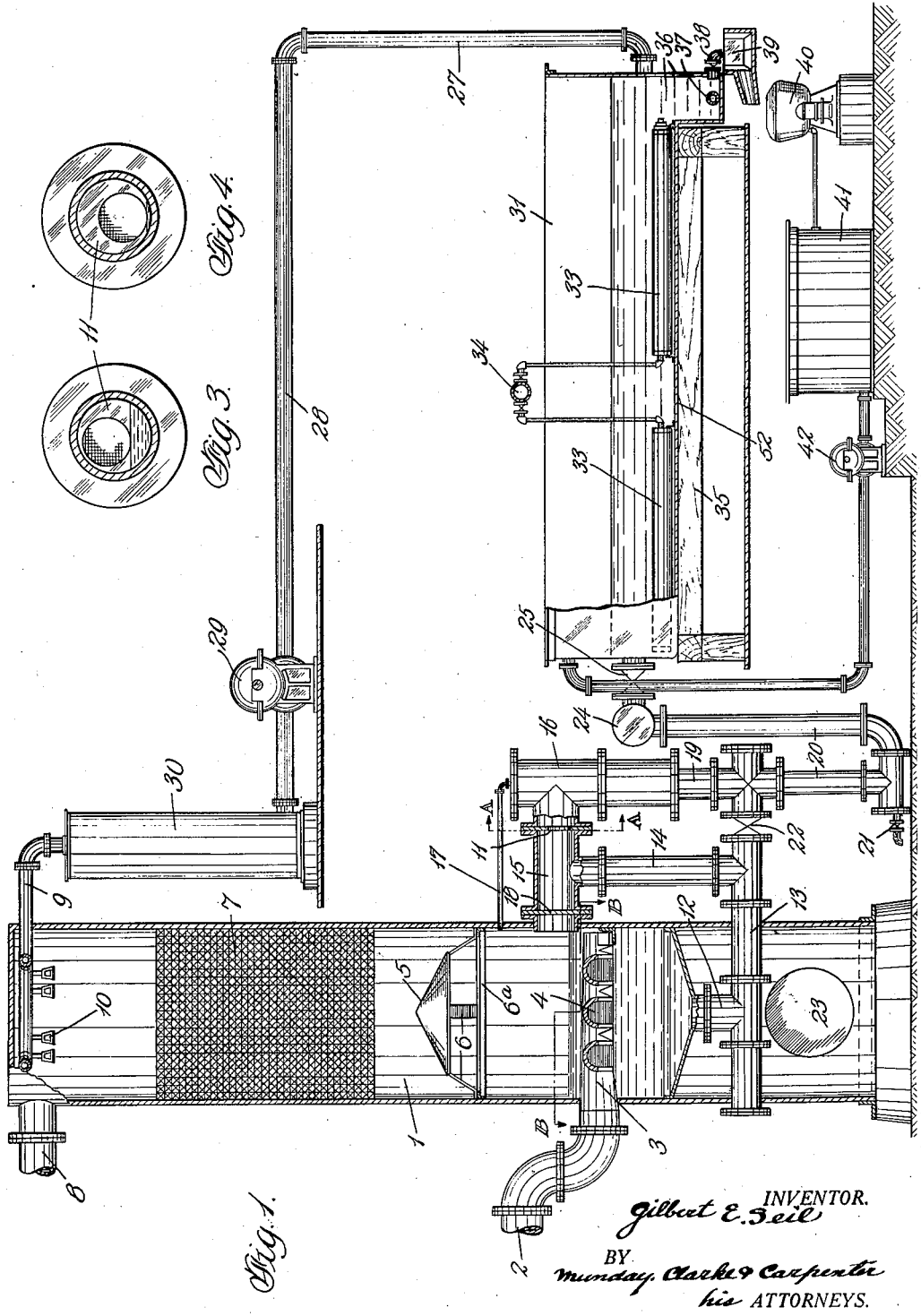

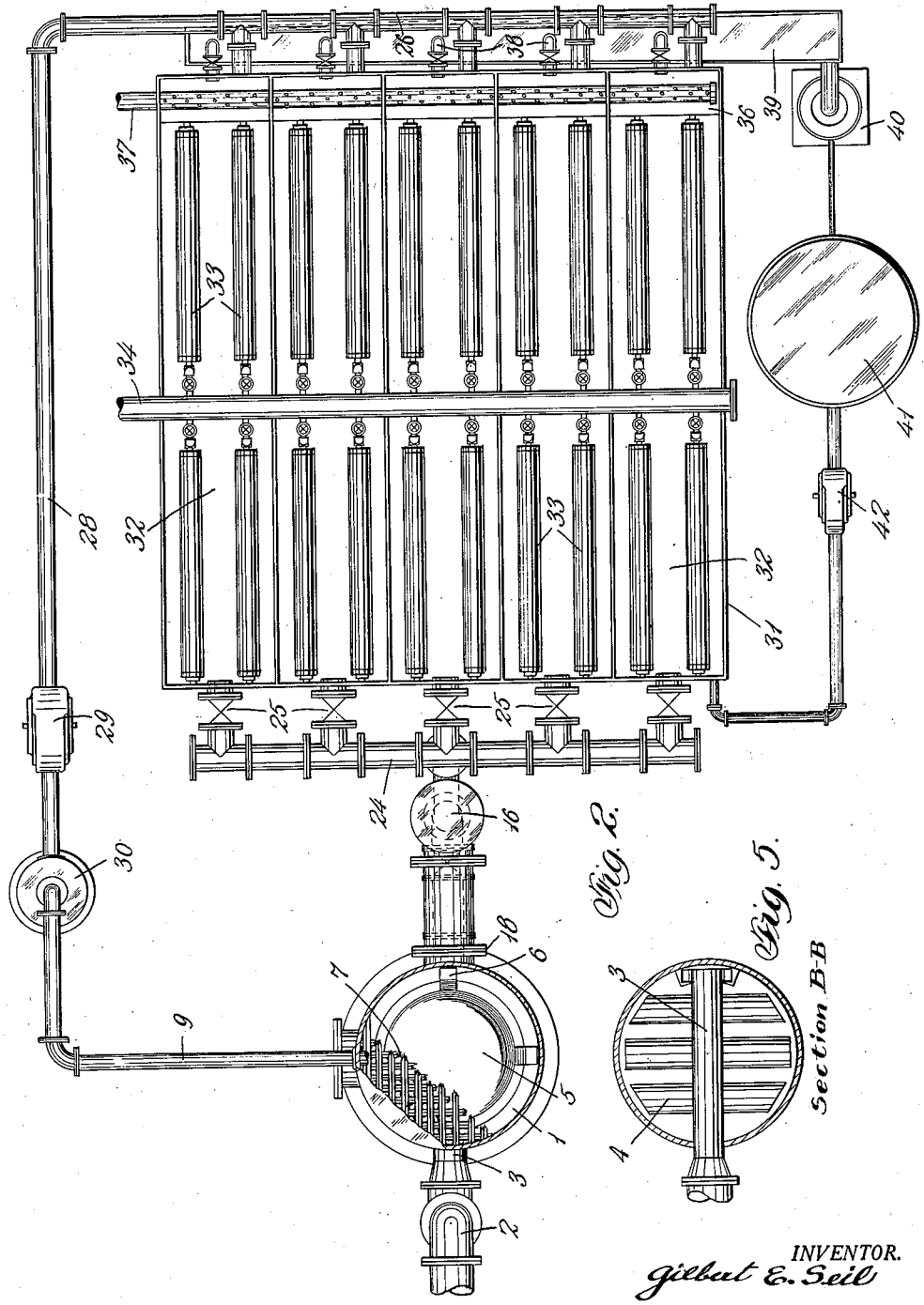

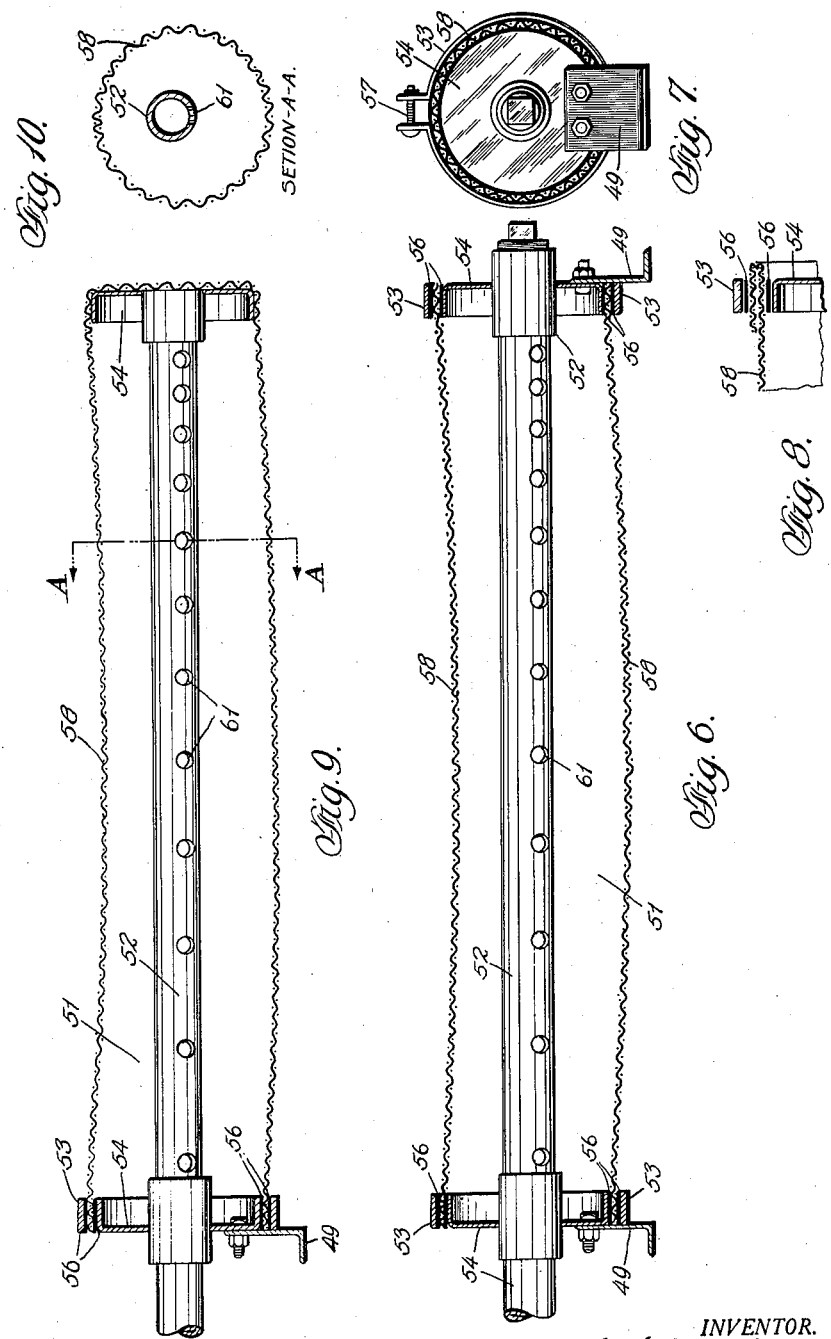

April 22, 1930.　　　　G. E. SEIL　　　　1,755,614
AERATION AND GAS PURIFICATION APPARATUS
Filed April 9, 1925　　　5 Sheets-Sheet 4
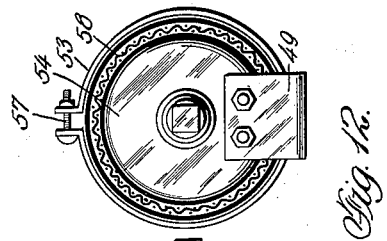
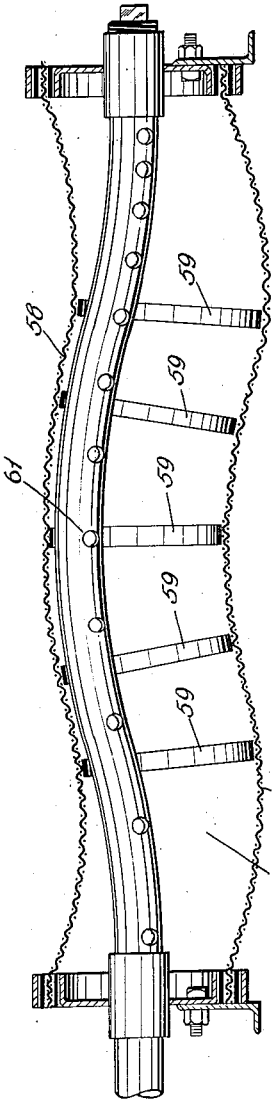
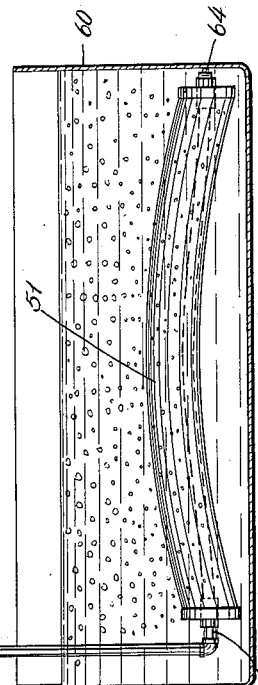
Inventor
Gilbert E. Seil
By
Munday, Clarke & Carpenter
his Attorneys April 22, 1930.  G. E. SEIL  1,755,614
AERATION AND GAS PURIFICATION APPARATUS
Filed April 9, 1925  5 Sheets-Sheet 5

INVENTOR
Gilbert E. Seil
BY
Munday, Clarke Hampton
his ATTORNEYS

Patented Apr. 22, 1930

1,755,614

UNITED STATES PATENT OFFICE

GILBERT E. SEIL, OF NEWARK, NEW JERSEY, ASSIGNOR TO THE KOPPERS COMPANY, OF PITTSBURGH, PENNSYLVANIA, A CORPORATION OF PENNSYLVANIA

AERATION AND GAS-PURIFICATION APPARATUS

Application filed April 9, 1925. Serial No. 21,978.

This invention relates to apparatus for the aeration of liquids, more particularly for the aeration of gas purification liquids, with or without precipitation therefrom of sulphur or other suspended matter, but also for the flotation of sulphur or other matter on gas purification liquids, with its removal therefrom as foam, and also for metallurgical or other flotation processes, or for the aeration of sewage and other treatments of liquids involving the blowing of a gaseous medium thereinto.

In the aeration of liquids by means of finely atomized air it has been proposed to pass the air into the liquid through a finely porous rigid material such as earthenware, alundum, and the like, and it has also been proposed to employ porous tubular envelopes closely bound or otherwise rigidly supported about air diffusing pipes.

Since the liquid material to be aerated generally contains solid matter in suspension, with all the types of aeration apparatus that have been hitherto employed there has been considerable difficulty on account of the fact that the solids will be deposited in the pores of the porous aeration material and so clog the material that no air can be passed through. This is particularly true in those processes of flotation which involve the introduction of finely comminuted air into a mass of liquid containing a considerable portion of solids in suspension.

The primary object of the present invention is to provide an aeration apparatus in which the aerating partition or envelope, to a large extent, automatically frees itself of any solid matter that may be deposited.

The invention consists broadly in providing an aeration apparatus with an aerating partition or envelope of soft pliable porous material supported with freedom of movement for the purpose of mechanically detaching solid matter which lodges on the material.

The preferred material is a woven fabric such as cotton, canvas, linen, silk, wool, etc. which material may or may not be impregnated with water-proof materials such as resin, rubber, paraffin, nitrocellulose compounds, etc. but an unwoven material, for example, chamois leather may also be successfully employed.

The invention further consists in such other new and useful improvements, and has for further objects such other operative advantages or results, as may be found to obtain in the apparatus hereinafter described or claimed.

In the accompanying drawings forming part of this specification and showing for purposes of exemplification certain form and manner in which the invention may be embodied and practiced, but without limiting the claimed invention to such illustrative instances:

Fig. 1 is an elevational view, partly in section, of a gas purification plant comprising aeration apparatus according to the invention adapted for recovery of solids in sludge form;

Fig. 2 is a plan view of the plant shown in Fig. 9;

Figs. 3 and 4 are detail views of the plant shown in Fig. 1;

Fig. 5 is a section at the line B—B of Fig. 1;

Fig. 6 is a longitudinal vertical section of an aerator of tubular form;

Fig. 7 is an end view of the aerator shown in Fig. 6;

Fig. 8 is a detail of such an aerator modified;

Fig. 9 is a longitudinal vertical section of a modified construction;

Fig. 10 is a section on the line A—A of the aerator of Fig. 9;

Fig. 11 is a longitudinal vertical section of a further modification;

Fig. 12 is an end view of the aerator of Fig. 11;

Fig. 13 illustrates a mode of mounting an aerator in a tank;

Figure 14:
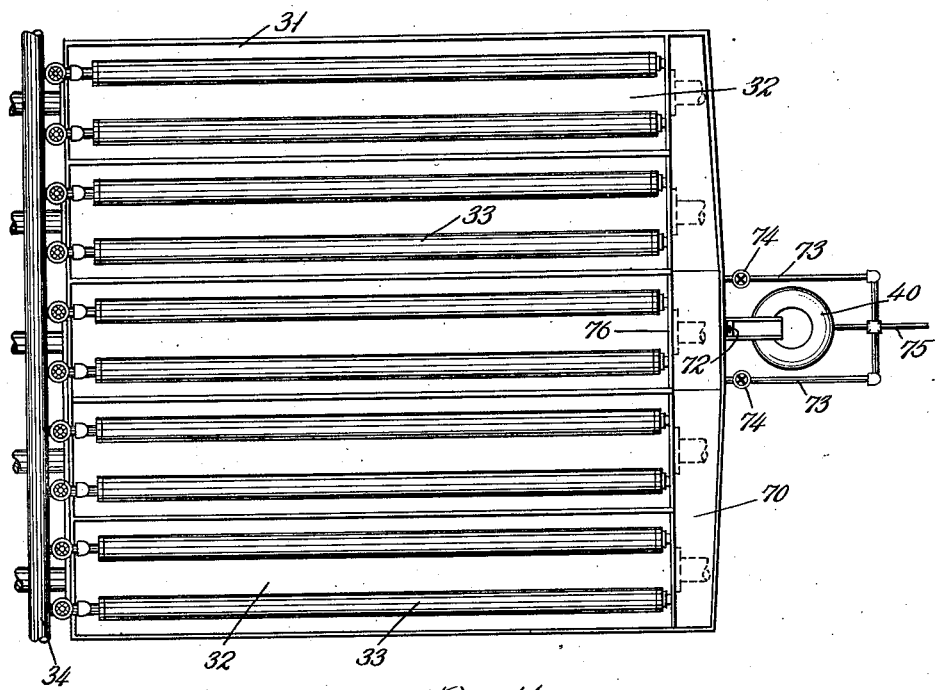
Fig. 14 is a plan view of an alternative form of aeration apparatus or thionizer which may be substituted for or combined with the aerating apparatus shown in Fig. 1 and which is adapted for the removal of solids by flotation in the form of foam, instead of as sludge.

The aerators illustrated in the drawings are of tubular configuration, which is the preferred form, although other arrangements may be employed providing the pliable porous aerating material is given freedom of motion in all directions, so that it may be vibratile. If the material is merely fixed in a horizontal or slightly inclined frame there is insufficient freedom of motion because the weight of the liquid on the one side and the pressure of the air on the other hold it in comparatively rigid state. According to the invention the material may be fixed loosely in vertical frames, but this arrangement is not so good as the tubular form described. By reason of the manner of mounting the fabrics, the tubes are vibratile while air under pressure is forced through them, and the vibratile tubes shake and vibrate and so mechanically detach any solid material which lodges through capillary or other pressure. A pump is usually used to provide the pressure for forcing the air through the tubes, and the air is affected by the pulsations of the motor, and, consequently, the fabric is affected by such pulsations and vibrates while the air is flowing through the fabric.

The aerating material, which may be any of those previously mentioned or the equivalent, is sewn into a tubular envelope 51 encircling a perforated pipe 52 which distributes the air equally, but spaced therefrom as shown. In one form (Fig. 6) the two ends of the tube are held by clamps 53 encircling flanged end pieces 54 which close the ends of the tube. In another form (Fig. 9) the fabric is shown with one end closed and enveloping the corresponding end piece 54, being fitted in such a way that only a single clamp 53 at the other end is needed. Gaskets 56 may be used to make an air tight joint between the fabric 58 and the end piece 54 on the one side and between the fabric 58 and the clamp 53 on the other side, the clamp being tightened by the bolt 57. The ends of the fabric tube may be reinforced by doubling back the fabric as shown in Fig. 8. Brackets 49 may be provided to hold the tubular envelope away from the floor of the tank in which it is placed.

In the arrangement shown in Fig. 11, the air distributing pipe is curved upward. This permits freedom of movement of the fabric tube which, when placed in a tank of liquid and inflated with air, assumes a shape similar to that indicated in Fig. 13.

The tubes 51 may be reinforced with circumferential ribs 59 (Fig. 11) which may be formed of the fabric itself, or may be of some other material such as rubber, metal wire, etc. Elastic longitudinal ribs may also be provided. These ribs must be such as not to interfere with the freedom of the tubes, and have the function of preventing any wear of the tube wall due to rubbing against the air distributing pipe. The fabric may be of one or more layers. A tubular envelope of any of the forms described, or a plurality thereof are mounted in a tank 60, preferably in such a way that the tube, or any tube may readily be removed from the tank. The air delivery pipe 52 extends into or through the tube and its perforations 61 deliver the air diffusely into the tube. A diffuser pipe is not absolutely necessary, as the tubes may be simply held in an open frame and air injected at one or both ends of this.

A convenient arrangement for connecting the tubular fabric aerator with an air manifold is shown in Fig. 13. One end of the diffuser pipe is pivotally jointed at 65 relatively to the air main 66, in such a manner that the buoyancy of the tube 51 gives the aerator a tendency to pivot on the joint 65, which tendency is resisted by the contact of the end 64 of the aerator against the side of the tank 60, whereby no clamp is necessary to keep the tube from rising. When it is desired to remove the aerator from the tank 60, all that is necessary is to disconnect the joint 65. Where the design of the tank is such that it is undesirable to extend the tube the entire distance across the tank, an arrangement should be provided for holding down the end 64 so as to resist the buoyancy of the tube.

A useful application of the aerator according to the present invention is in connection with the purification of fuel gases from hydrogen sulphide and especially in apparatus for carrying out the processes described in the assignee's copending applications of Frederick W. Sperr, Jr., Ser. No. 718,253, filed June 6, 1924, now Patent No. 1,578,560 issued March 30, 1926 and of Frederick W. Sperr, Jr., and David L. Jacobsen Ser. No. 730,676, filed Aug. 7, 1924, now Patent No. 1,656,881 issued January 17, 1928, and in the gas purification plant more particularly described in the assignee's application of Frederick W. Sperr, Jr., Ser. No. 21,983 filed of even date herewith.

Such a plant as that described in the last named application is illustrated in Figs. 1–5 of the drawings. In these drawings, 1 is a scrubber tower wherein the gas to be purified is washed with a liquid capable of absorbing the impurities to be removed. The gas enters through an inlet pipe 2 and is discharged purified by an outlet 8 at the top of the scrubber.

The lower part of the absorber has "cracker pipes" 4, to which the gas is conducted through a manifold 3. The gas bubbles through the liquor into which these "cracker pipes" dip and then passes up around a baffle 5, and through the upper part of the tower which may be filled with hurdles 7.

The baffle 5 has the function of preventing any spray from the bubbling section from splashing up on to the hurdles and also has other useful purposes, such as catching and deflecting the liquor from the hurdles so that it will wash down the sides of the absorber and remove any solid matter that may there be deposited. The baffle is supported by legs 6, attached to an angle iron 6ª secured to the wall of the tower.

The hurdles may be replaced by other types of filling material or may be omitted altogether. In fact this particular scrubber may be replaced by other well known types.

The circulating liquor preferably consists of a suspension of a ferric compound in an alkaline solution such as a solution of sodium carbonate, the ferric compound reacting with the hydrogen sulphide in the gas to form ferric sulphide which is regenerated with formation of free sulphur in the aerators.

The liquid enters the upper part of the absorber through a pipe 9, and is distributed by sprays 10. The operation is such that the lower part of the absorber is kept partly filled with the liquid, the level of which is controlled by an eccentrically apertured disc 11, which is shown in different positions in Figs. 3 and 4. The liquid passes out through pipe 12, 13, 14 and 15, through the disc 11, to a separator 16, which is vented back to the tower by a pipe 17. The flanges 18 on the pipe 15 are ordinarily blanked to prevent by-passing of the liquid.

The liquid from the separator passes down through a pipe 19 and through a seal 20, which has a drain 21. There is a direct connection between pipes 13 and 19 which contains a valve 22 which is ordinarily kept closed but may be opened from time to time to wash out any sediment. An opening 23 is provided in the shell of the tower to make the solution piping accessible.

From the seal 20, the liquid passes to a manifold 24, from which it is distributed through valves 25, to the various compartments of the "thionizer," which is a convenient term for the tank containing the special aerators according to the present invention, and wherein the sulphur is expelled from the spent liquid and is either floated to the surface as a foam, or is precipitated as a sludge. From the tank the liquid passes to a manifold 26, and thence is pumped through pipes 27 and 28, by a pump 29, through a heater 30, and back to the absorber.

The thionizer tank 31 has several compartments 32, each of which may contain one or more of the aerator tubes 33, and these tubes may be arranged either longitudinally or transversely. The tubes are connected with an air manifold 34. The construction and operation of the tubes are as previously described.

The tank is shown supported on a platform 35. In the form shown in Figs. 1 and 2 the tank 31 has a depressed portion 36, which has a perforated air pipe 37 and outlets 38. The sulphur accumulates in this depressed portion and is drawn off as a sludge into a trough 39, from which it goes to a centrifuge 40. The liquid drained from the centrifuge goes to a sump 41, and is pumped by a pump 42, back to the thionizer tank 31.

Figure 15:
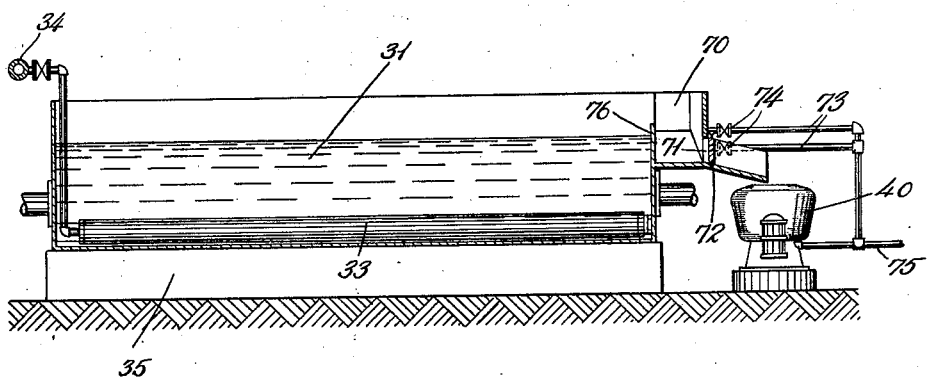
Fig. 15 is a vertical section through the middle of Fig. 14.

In the form of thionizer shown in Figs. 14 and 15, the sulphur is removed by flotation in the form of a foam. Flotation agents, such as a very small amount of kerosene, may be added to the system to assist in the separation of the sulphur by this method but ordinarily this is not required. A trough 70, known as the foam trough, is provided on the outlet side of the thionizer tank. This trough is provided with a sludge outlet 71 having a gate 72. It may also have manifold connections 73 with valves 74 connected to a drain 75 from the centrifuge 40.

By the action of the minute air bubbles, the sulphur is floated to the top of the liquid in the tank and the resulting foam may be allowed to run continuously over a partition 76 into the centrifuge 40.

As an alternate method of operation, the sulphur may be allowed to accumulate in the tank, the amount of aeration being insufficient to cause the foam to overflow. At intervals the air pressure may be increased causing a quantity of the foam to overflow into the trough 70. This foam very quickly subsides, the sulphur accumulating in the bottom of the trough under a layer of the liquid. This supernatant liquid is drawn off through one or more of the manifold connections 73 and the gate 72 is opened and the sulphur transferred to the centrifuge.

In either form of thionizer the centrifuge may be replaced by a filter, continuous or intermittent.

The heater 30 employed in the installation of Figs. 1 and 2 facilitates the separation of sulphur in sludge form and may be omitted where it is desired to separate the sulphur by flotation as a foam.

Instead of the absorber shown and described herein, there may be employed an apparatus containing alternating diffuser and contact strata in accordance with the invention described in the assignee's application Serial Number 21,980, filed April 9, 1925, of Frederick W. Sperr, Jr., filed of even date herewith which matured to Patent 1,715,253 issued May 8, 1929.

The invention as hereinabove set forth or exemplified may be variously practiced or embodied within the scope of the claims hereinafter made.

I claim:

1. Means for use in aeration of liquids comprising a frame, pliable woven fabric of tubular form fixed at one end of said frame and held suspended thereby in a substantially horizontal plane so that the fabric is vibratile; an upwardly curved perforated air pipe extending substantially horizontally within said tube; means for supplying air to said tube through said pipe; means clamping the end of the fabric to said frame; gaskets interposed between said fabric and said clamping means and frame; and circumferential ribs constructed on the interior of said tubular fabric.

2. Means for use in diffusing air in liquids containing solid matter in suspension comprising a frame, soft pliable woven fabric of tubular form fixed at one end to said frame and held suspended thereby in a substantially horizontal plane so that the tube is vibratile; an upwardly curved perforated air pipe extending substantially horizontally within said tube; means clamping the end of the fabric to said frame; gaskets interposed between said fabric and said clamping means and frame, the end of said fabric being doubled between said gaskets; and circumferential ribs constructed on the interior of the tubular fabric.

3. Means for use in diffusing air in liquids containing solid matter in suspension comprising a frame, soft pliable woven fabric of tubular form fixed at one end to said frame and held suspended thereby in a substantially horizontal plane so that the tube is vibratile; an upwardly curved perforated air pipe extending substantially horizontally within said tube; and means clamping the end of the fabric to said frame.

4. Means for use in diffusing air in liquids containing solid matter in suspension comprising a frame, soft pliable porous material of tubular form fixed at one end to said frame and held suspended thereby in a substantially horizontal plane so that the tube is vibratile, an upwardly curved perforated air pipe extending substantially horizontally within said tube; means clamping the end of the tube to said frame; and circumferential ribs constructed on the interior of the tube.

5. Apparatus for aeration of liquids comprising a tank for holding the liquid, a tubular envelope of vibratile pliable porous material supported with freedom for vibratile movement within said tank and forming therein an intervening partition adapted for passage of air therethrough into liquid in said tank, and a perforated air delivery pipe extending within and encircled by said tubular envelope, and in which the tubular envelope has its wall held spaced from the air delivery pipe for a distance sufficient to maintain the vibratile wall substantially free of contact with the air delivery pipe when the envelope is inflated with air and thereby buoyed up in the liquid.

6. Apparatus for the aeration of liquids comprising a tank for holding the liquid, a tubular envelope of vibratile pliable porous material supported with freedom for vibratile movement within said tank and forming therein an intervening partition adapted for passage of air therethrough into liquid in said tank, and a curved air distributing pipe extending within and encircled by said tubular envelope.

7. Apparatus for aeration of liquids comprising a tank for holding the liquid, and a plurality of tubular envelopes of vibratile pliable porous material supported with freedom for vibratile movement within said tank and forming therein intervening partitions adapted for passage of air therethrough into liquid in said tank, and in which each of said tubular envelopes has a pivotal support at one end while its other end is held down in said tank by restraining engagement of the tank with said other end.

8. Apparatus for aeration of liquids comprising: spaced supporting members; a tubular envelope of vibratile pliable porous material mounted on said supports so as to be suspended therebetween; and a perforated air delivery pipe extending within and encircled by said tubular envelope, said envelope being suspended between said supports so as to sag therebetween and so as to have its wall held spaced from the air delivery pipe a distance sufficient to maintain the vibratile wall substantially free of contact with the air delivery pipe when the envelope is inflated with air and thereby buoyed up in the liquid.

9. In apparatus for purification of gases comprising an absorber chamber adapted for removal of impurities from gas by contact with gas washing liquid therein, an actifier for revivification by aeration of the gas washing liquid, means for circulating said liquid to and fro between the absorber and the actifier, and means for supplying aeration gas to said actifier, the combination of spaced supporting members in said actifier tank, a tubular envelope of vibratile pliable porous material mounted on said supports so as to be suspended therebetween, and a perforated air delivery pipe communicating with said means for supplying aeration gas and extending within and encircled by said tubular envelope, said envelope being mounted on said supports so as to sag therebetween and so as to have its wall held spaced from the air delivery pipe a distance sufficient to maintain the vibratile wall substantially free of contact with the air delivery pipe when the envelope is inflated with air and thereby buoyed up in the liquid.

10. In apparatus for purification of gases comprising an absorber chamber adapted for removal of impurities from gas by contact with gas washing liquids therein, an actifier for revivification by aeration of gas washing liquid, means for circulating said liquid to and fro between the absorber and the actifier, and aeration gas supply means for supplying aeration gas to said actifier, the combination of a vibratile pliable porous partition loosely supported whereby it is substantially free for vibratile movement within said actifier tank and forming therein an intervening partition adapted for passage of gas therethrough from said aeration gas supply means to liquid in said tank, said vibratile pliable porous partition being so mounted on its support so that it sags therefrom when supply of aeration gas thereto from said aeration gas supply means is discontinued.

In testimony whereof I have hereunto set my hand.

GILBERT E. SEIL.